(12) United States Patent
Lee et al.

(10) Patent No.: US 9,229,974 B1
(45) Date of Patent: Jan. 5, 2016

(54) CLASSIFYING QUERIES

(71) Applicant: Google Inc., Mountain View, CA (US)

(72) Inventors: John J. Lee, Long Island City, NY (US); Melissa K. Carroll, White Plains, NY (US)

(73) Assignee: Google Inc., Mountain View, CA (US)

( * ) Notice: Subject to any disclaimer, the term of this patent is extended or adjusted under 35 U.S.C. 154(b) by 350 days.

(21) Appl. No.: 13/656,959

(22) Filed: Oct. 22, 2012

Related U.S. Application Data

(60) Provisional application No. 61/654,455, filed on Jun. 1, 2012, provisional application No. 61/654,518, filed on Jun. 1, 2012.

(51) Int. Cl.
G06F 17/30 (2006.01)

(52) U.S. Cl.
CPC .................. G06F 17/30424 (2013.01)

(58) Field of Classification Search
USPC .......................................................... 707/722
See application file for complete search history.

(56) References Cited

U.S. PATENT DOCUMENTS

| | | | |
|---|---|---|---|
| 5,685,000 A | 11/1997 | Cox | |
| 5,694,558 A | 12/1997 | Sparks et al. | |
| 6,792,406 B1 | 9/2004 | Fujimura et al. | |
| 6,829,603 B1 | 12/2004 | Chai et al. | |
| 7,415,406 B2 | 8/2008 | Huang et al. | |
| 7,461,047 B2 | 12/2008 | Masuichi et al. | |
| 7,587,420 B2 | 9/2009 | Kobayashi et al. | |
| 7,603,330 B2 | 10/2009 | Gupta et al. | |
| 7,603,348 B2 | 10/2009 | He et al. | |
| 7,610,556 B2 | 10/2009 | Guo et al. | |
| 7,640,164 B2 | 12/2009 | Sasaki et al. | |
| 7,779,009 B2 | 8/2010 | Chowdhury et al. | |
| 7,920,682 B2 | 4/2011 | Byrne et al. | |
| 7,949,517 B2 | 5/2011 | Eckert et al. | |
| 7,966,316 B2 | 6/2011 | Cao et al. | |
| 7,996,419 B2 | 8/2011 | Pfleger | |
| 8,144,838 B2 | 3/2012 | Gorin et al. | |
| 8,214,363 B2 | 7/2012 | Chaudhary | |
| 8,244,752 B2 | 8/2012 | Buehrer et al. | |
| 8,249,879 B2 | 8/2012 | Bangalore et al. | |
| 8,380,519 B2 | 2/2013 | Lavoie et al. | |

(Continued)

FOREIGN PATENT DOCUMENTS

| | | |
|---|---|---|
| WO | 00/11571 | 3/2000 |
| WO | 02/09094 | 1/2002 |

(Continued)

OTHER PUBLICATIONS

Carbonell R. Jaime, "Mixed-Initiative Man-Computer Instructional Dialogues", May 31, 1970. <http://files.eric.ed.gov/fulltext/ED040585.pdf>, 218 pages.

Primary Examiner — Son T Hoang
(74) Attorney, Agent, or Firm — Fish & Richardson P.C.

(57) ABSTRACT

Methods, systems, and apparatus, including computer programs encoded on a computer storage medium, for classifying queries. A query that includes one or more query terms is received. One or more entity identifiers are extracted from one or more search results that are responsive to the query. One or more of the query terms are compared with the extracted entity identifiers. Based on comparing the query terms with the extracted entity identifiers, the query is classified as an entity-triggering query or as a description-triggering query.

19 Claims, 12 Drawing Sheets

(56) References Cited

U.S. PATENT DOCUMENTS

| | | |
|---|---|---|
| 8,407,214 B2 | 3/2013 | Li et al. |
| 8,458,213 B2 | 6/2013 | Edmonds et al. |
| 8,537,979 B1 | 9/2013 | Pollock |
| 8,554,876 B2 | 10/2013 | Winsor |
| 8,589,807 B2 | 11/2013 | Baldwin et al. |
| 8,600,986 B2 | 12/2013 | Fan et al. |
| 8,631,002 B2 | 1/2014 | Suresh et al. |
| 8,671,106 B1 | 3/2014 | Lee et al. |
| 8,688,456 B2 | 4/2014 | Bangalore et al. |
| 8,719,192 B2 | 5/2014 | Ji et al. |
| 2001/0047261 A1 | 11/2001 | Kassan |
| 2002/0005865 A1 | 1/2002 | Hayes-Roth |
| 2002/0198714 A1 | 12/2002 | Zhou |
| 2003/0110041 A1 | 6/2003 | Breuer et al. |
| 2005/0080629 A1 | 4/2005 | Attwater et al. |
| 2005/0138018 A1 * | 6/2005 | Sakai et al. .......... 707/3 |
| 2005/0222977 A1 | 10/2005 | Zhou et al. |
| 2008/0097982 A1 | 4/2008 | Gupta |
| 2009/0070113 A1 | 3/2009 | Gupta et al. |
| 2009/0094223 A1 | 4/2009 | Berk et al. |
| 2009/0313217 A1 | 12/2009 | Signorini et al. |
| 2009/0327223 A1 * | 12/2009 | Chakrabarti et al. ............. 707/3 |
| 2010/0178645 A1 | 7/2010 | Ieperen et al. |
| 2011/0004618 A1 | 1/2011 | Chaudhary |
| 2011/0231347 A1 | 9/2011 | Xu et al. |
| 2011/0275047 A1 | 11/2011 | Gomes et al. |
| 2012/0016678 A1 | 1/2012 | Gruber et al. |
| 2012/0059838 A1 | 3/2012 | Berntson et al. |
| 2012/0077178 A1 | 3/2012 | Bagchi et al. |
| 2012/0101807 A1 | 4/2012 | Heo et al. |
| 2012/0330934 A1 | 12/2012 | Duboue et al. |
| 2012/0330948 A1 * | 12/2012 | Rault et al. .................... 707/728 |
| 2013/0007055 A1 | 1/2013 | Brown et al. |
| 2013/0018876 A1 | 1/2013 | Chu-Carroll et al. |
| 2013/0238594 A1 * | 9/2013 | Hong et al. ................... 707/710 |
| 2013/0290342 A1 | 10/2013 | Cooper et al. |
| 2014/0006012 A1 | 1/2014 | Zhou et al. |
| 2014/0108372 A1 | 4/2014 | Oh et al. |

FOREIGN PATENT DOCUMENTS

| | | |
|---|---|---|
| WO | 2006/003542 | 1/2006 |
| WO | 2008/022150 | 2/2008 |
| WO | 2013/010262 | 1/2013 |

* cited by examiner

CLASSIFYING QUERIES

CROSS-REFERENCE TO RELATED APPLICATIONS

This application claims the benefit of U.S. Provisional Application No. 61/654,455, filed on Jun. 1, 2012 and U.S. Provisional Patent Application No. 61/654,518, filed Jun. 1, 2012, both of which are incorporated herein by reference.

BACKGROUND

User devices, such as mobile telephones, implement a variety of techniques through which users can find information. For example, some user devices implement dialog systems, which may be able to audibly provide answers to questions submitted by users.

SUMMARY

The answers to some questions may include the name of an entity, such as a person, a business, a geographical location, or the like. The question "Who directed Titanic II?" may be an example of such a question, since the answer to the question may be the name of the person who directed the movie "Titanic II." On the other hand, the answers to some questions may include a summary of a topic. The question "What are the rules of Pai Gow poker?" may be an example of such a question, since the answer to the question may include information regarding the rules of Pai Gow poker.

Queries can be classified according to a type of answer that is appropriate for the queries. When the answer to a query is likely to be an entity name or other entity identifier, the query can be classified as an entity-triggering query. When the answer to a query is likely to be a description, the query can be classified as a description-triggering query. A query can be classified as entity-triggering and/or description-triggering based on characteristics of search results that are responsive to (e.g., relevant to) the query.

As an example, a set of search results can be obtained for a query, and entity identifiers can be extracted from the search results. The entity identifiers are compared with terms of the query. If each of the entity identifiers matches at least one term of the query, the query can be classified as a description-triggering query. If at least one of the entity identifiers does not match any terms of the query, the query can be classified as an entity-triggering query. In some implementations, a response to the query is provided based on the classification, for example, an entity identifier may be provided as an answer for an entity-triggering query, or a text snippet or other description may be provided as an answer for a description-triggering query.

According to one general aspect, a method comprises: receiving a query that includes one or more query terms; extracting one or more entity identifiers from one or more search results that are responsive to the query; comparing one or more of the query terms with the extracted entity identifiers; and based on comparing the query terms with the extracted entity identifiers, classifying the query as an entity-triggering query or as a description-triggering query.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, an entity-triggering query is a query for which an entity identifier is provided as an answer to the query. A description-triggering query is a query for which a natural language snippet associated with one or more search results is provided as an answer to the query. Based on comparing the query terms with the extracted entity identifiers, determining, for each of the extracted entity identifiers, whether the entity identifier matches one or more of the query terms. Classifying the query as an entity-triggering query or as a description-triggering query includes classifying the query as an entity-triggering query or as a description-triggering query based on determining, for each of the extracted entity identifiers, whether the entity identifier matches one or more of the query terms. Determining, for each of the extracted entity identifiers, whether the entity identifier includes one or more of the query terms includes determining that at least one of the extracted entity identifiers does not include any of the query terms. Classifying the query as an entity-triggering query or classifying the query as a description-triggering query includes classifying the query as an entity-triggering query based on determining that at least one of the extracted entity identifiers does not include any of the query terms.

These and other embodiments may each optionally include one or more of the following features. For instance, based on classifying the query as an entity-triggering query, selecting a response format designated for queries classified as entity-triggering queries, where the selected response format is not designated for queries classified as description-triggering queries; and providing a response to the query using the selected response format. Determining, for each of the extracted entity identifiers, whether the entity identifier includes one or more of the query terms includes determining that all of the extracted entity identifiers include at least one of the query terms. Classifying the query as an entity-triggering query or classifying the query as a description-triggering query includes classifying the query as a description-triggering query based on determining that all of the extracted entity identifiers include at least one of the query terms. Based on classifying the query as a description-triggering query, selecting a response format designated for queries classified as description-triggering queries, where the selected response format is not designated for queries classified as entity-triggering queries; and providing a response to the query using the selected response format.

These and other embodiments may each optionally include one or more of the following features. For instance, extracting one or more entity identifiers from the search results includes extracting multiple entity identifiers from the search results. Determining that a plurality of entity identifiers in the multiple entity identifiers do not include any of the query terms; selecting, from among the plurality of entity identifiers, an entity identifier that was extracted from a highest-scoring search result of the identified search results; and indicating that the selected entity identifier is an answer to the query. Extracting one or more entity identifiers from the search results includes extracting multiple entity identifiers from the search results. Determining that a plurality of entity identifiers in the multiple entity identifiers do not include any of the query terms; counting, for each entity identifier in the plurality of entity identifiers, a number of the search results from which the entity identifier was extracted; selecting, from among the plurality of entity identifiers, the entity identifier that was extracted from the highest number of the search results; and indicating that the selected entity identifier is an answer to the query.

Advantageous implementations can include one or more of the following features. Classification of queries may permit more appropriate responses to queries. The likelihood that a response to a query includes the information requested by the user may be increased. An appropriate type of information can be provided in response to a query, and the appropriate type of information can be designated as the answer to a user's question.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1A:
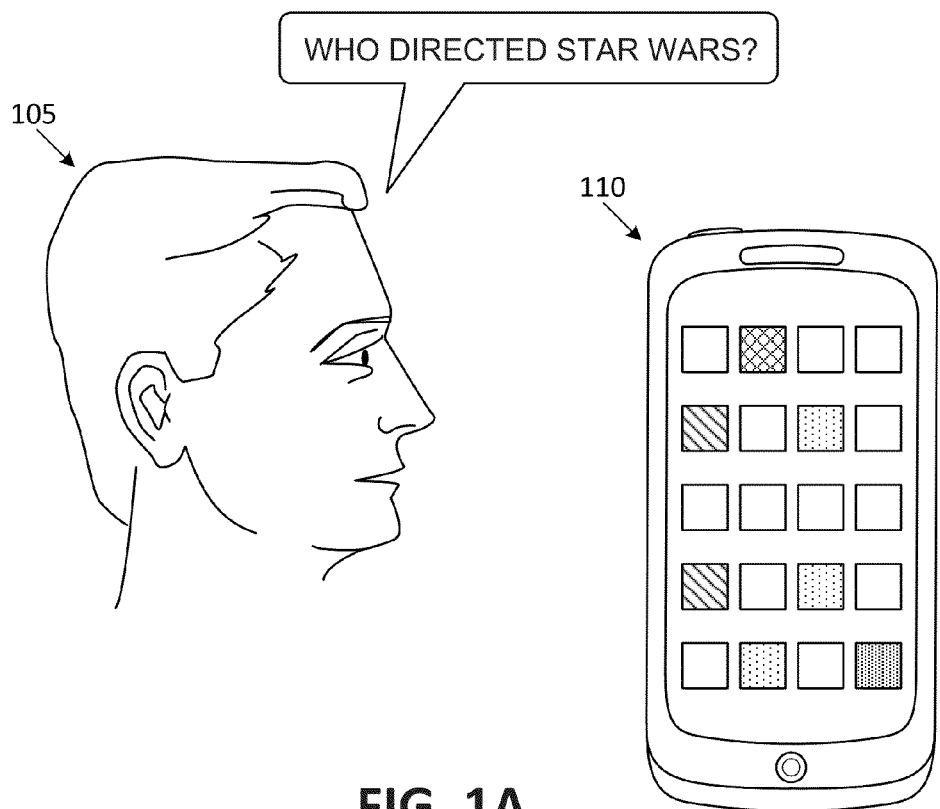
FIGS. 1A-2C illustrate an overview of example implementations described herein.
Figure 1B:
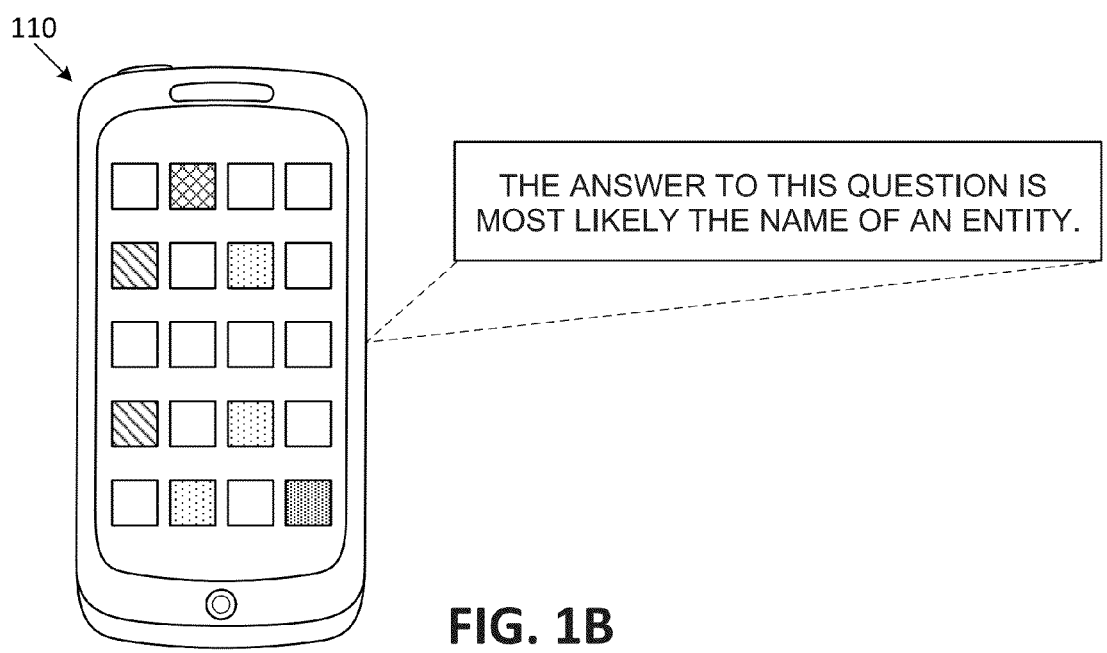

The following detailed description refers to the accompanying drawings. The same reference numbers in different drawings may identify the same or similar elements.

Queries may be classified (e.g., assigned to different classes or categories) according to whether the query is likely an entity-triggering query, or a description-triggering query, where an entity-triggering query is a query that is answered by identifying an entity, and a description-triggering query is answered by providing a description. The type of information that is an appropriate answer for a query may be inferred using search results to the query. In some implementations, the classifications to which queries are assigned correspond to different types of information that users likely intend to obtain when submitting the queries.

Queries that are answered or satisfied by a particular type of information may be assigned to the same class or category. For example, a query that is a request for a name of a particular entity (e.g., a name of a particular person, place, thing, idea, etc.) may be classified as an entity-triggering query. Typically, an appropriate response to an entity-triggering query is the requested name (e.g., an entity identifier that identifies the particular entity). In many instances, the requested name will be different from entity identifiers included in the query. As another example, a query that specifies an entity by name and is a request for information about the named entity may be classified as a description-triggering query. Typically, an appropriate response to a description-triggering query is information describing the named entity, including information beyond simply an identifier for the named entity. For example, in some implementations, a response to a description-triggering query includes a natural language statement (e.g., a phrase, sentence, etc.) about the named entity. The response to a description-triggering query may be a snippet associated with one or more search results that are responsive to the query.

In some implementations, a query that includes one or more query terms is received. One or more entity identifiers are extracted from one or more search results that are responsive to the query. One or more of the query terms are compared with the extracted entity identifiers. Based on comparing the query terms with the extracted entity identifiers, the query is classified as an entity-triggering query or as a description-triggering query.

A system and/or method, described herein, may enable one or more devices to classify queries as entity-triggering queries and/or description-triggering queries. In some implementations, one or more devices may be configured to provide responses that are associated with entities, in response to entity-triggering queries. In some implementations, one or more devices may provide responses that are associated with descriptions, in response to description-triggering queries.

As further described herein, an entity-triggering query may be a query to which a response includes an entity identifier. Examples of entities include a person, a business, a geographical location, a movie, and a song. An entity identifier may be, for example, a name of an entity; a physical address; a telephone number; an email address; a date; or other information that identifies an entity. A description-triggering query may be a query to which a response includes a description, such as a description of a topic, a summary of a movie, song lyrics, a summary of a news article, etc.

FIGS. 1A-2C illustrate an overview of example implementations described herein. For example, as shown in FIG. 1A, a user 105 may speak or otherwise submit a question 107, "Who directed Star Wars?" to a user device 110. As shown in FIG. 1B, the user device 110, or another device connected to the user device 110 over a network, may determine that an answer to the question "Who directed Star Wars?" is associated with an entity. In other words, user device 110 may classify the question "Who directed Star Wars?" as an entity-triggering query.

Figure 1C:
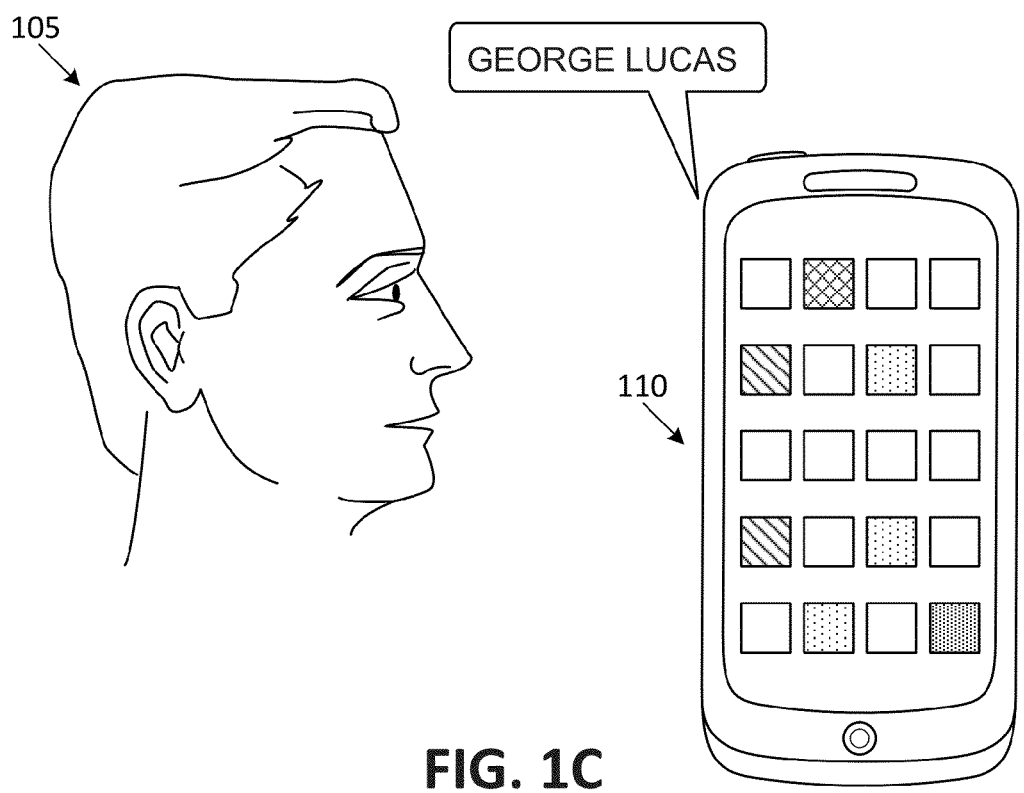

In response, user device 110 may output a response that includes an entity identifier. For example, as shown in FIG. 1C, user device 110 may output information associated with the entity "George Lucas." For instance, user device 110 may output the name "George Lucas." In some implementations, the user device 110 receives the query by recording utterances of the user with a microphone. The user device 110 then provides the answer to the query as synthesized speech or other audible output.

Figure 2A:
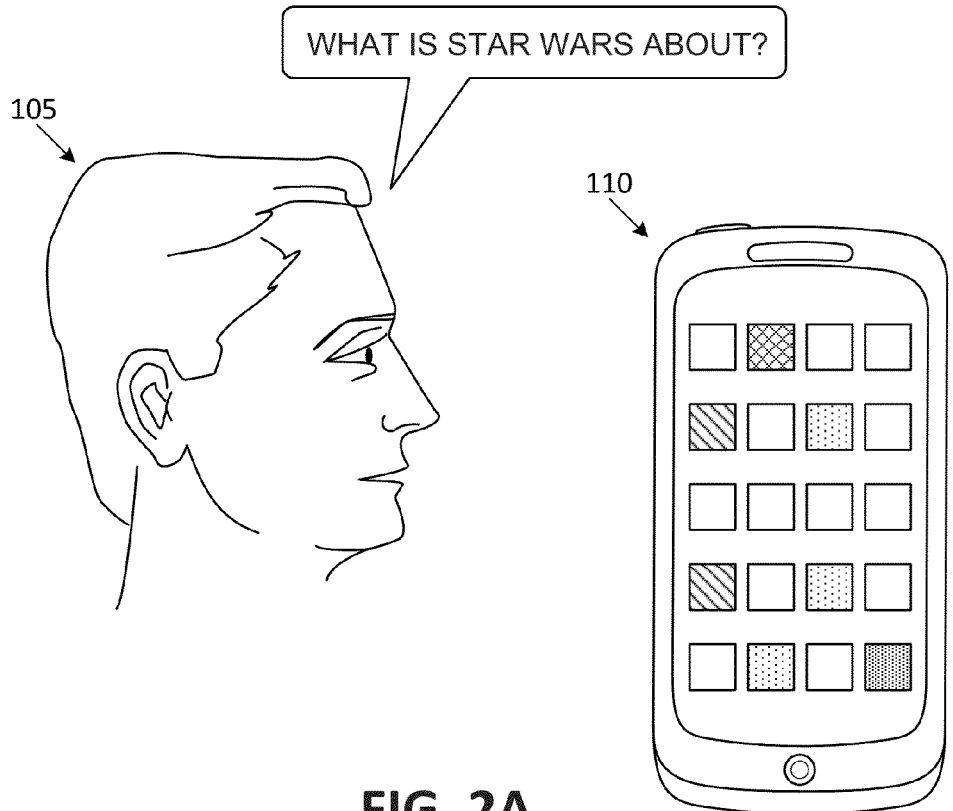
Figure 2B:
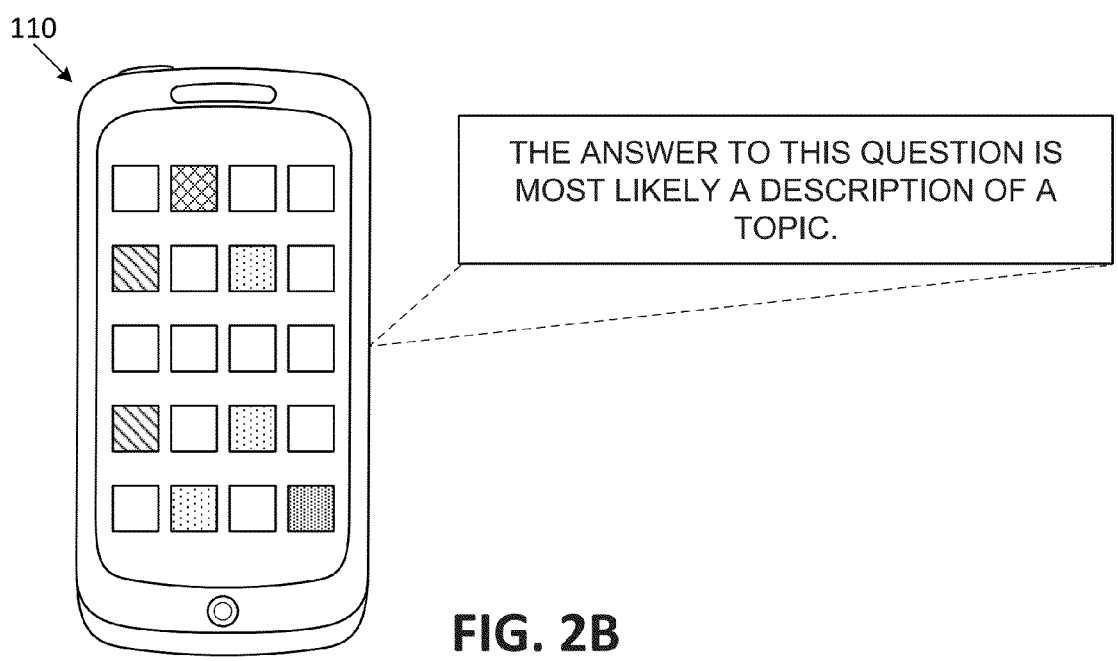

FIG. 2A illustrates user 105 asking a question, "What is Star Wars about?" to user device 110. As shown in FIG. 2B, user device 110 may determine that an answer to the question "What is Star Wars about?" is a description. In other words, user device 110 may classify the question "What is Star Wars about?" as a description-triggering query.

Figure 2C:
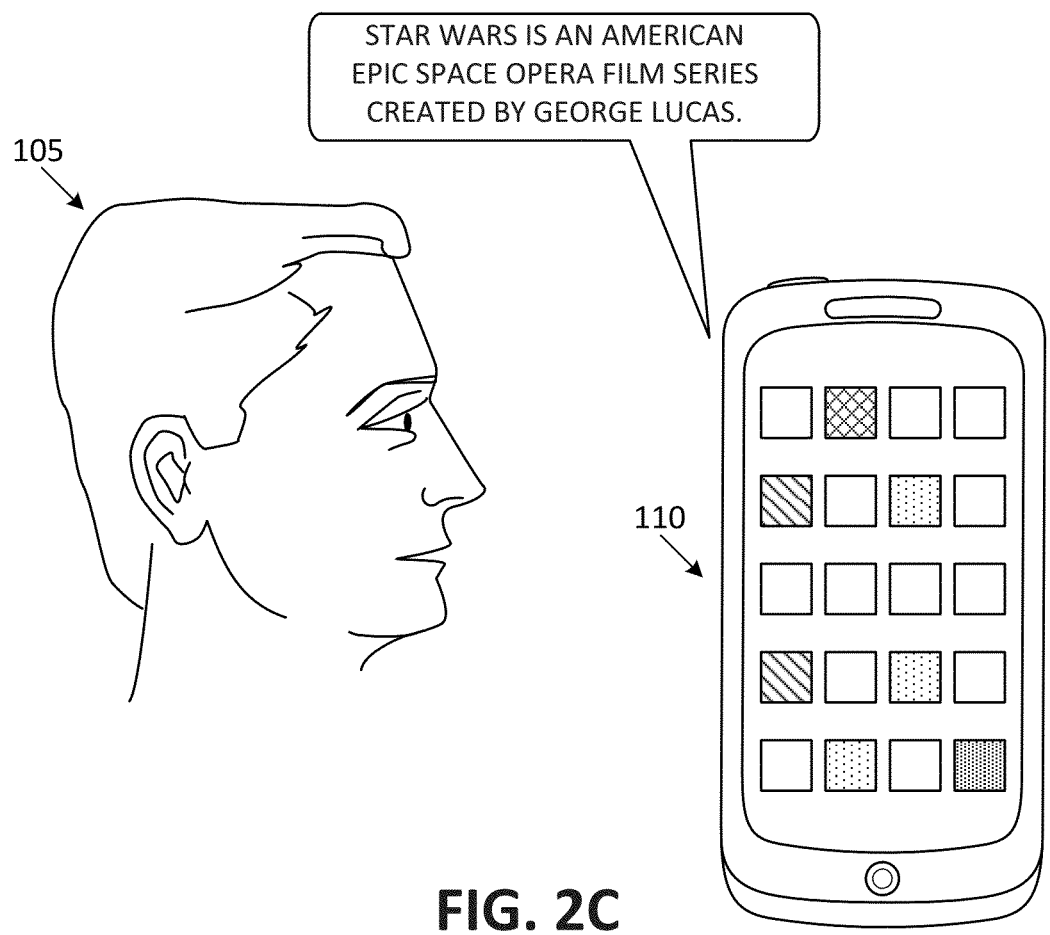

In response, user device 110 may output a response that is a description. For example, as shown in FIG. 2C, user device 110 may output a response that includes a brief description of the movie "Star Wars." This description may include, for instance, the sentence, "Star Wars is an American epic space opera film series created by George Lucas."

By classifying queries as entity-triggering queries and/or description-triggering queries, a device, such as user device 110, may provide appropriate and accurate answers that include entity identifiers and/or descriptions. Furthermore, a user device may avoid erroneously providing an entity identifier as a response to a description-triggering query, or providing a description as a response to an entity-triggering query.

In some implementations, classification of a query as an entity-triggering query and classification of the query as a description-triggering query are mutually exclusive. That is, in some implementations, a given query may be classified as either entity-triggering or description-triggering, but may not be simultaneously classified as both an entity-triggering query and as a description-triggering query.

In some implementations, a classification system outputs confidence scores for classification decisions. For example, the confidence score may indicate an amount of confidence the classification system has in the correctness of a classification of a particular query. In some implementations, a response format is selected based on a classification only when the confidence score is determined to satisfy a threshold. For example, a response format designated for entity-triggering queries is used only when a confidence score indicating confidence that the query is an entity-triggering query exceeds a threshold value. Confidence scores can be generated based on search results for a query or any of the other factors or determinations described below for classifying queries.

Figure 3:
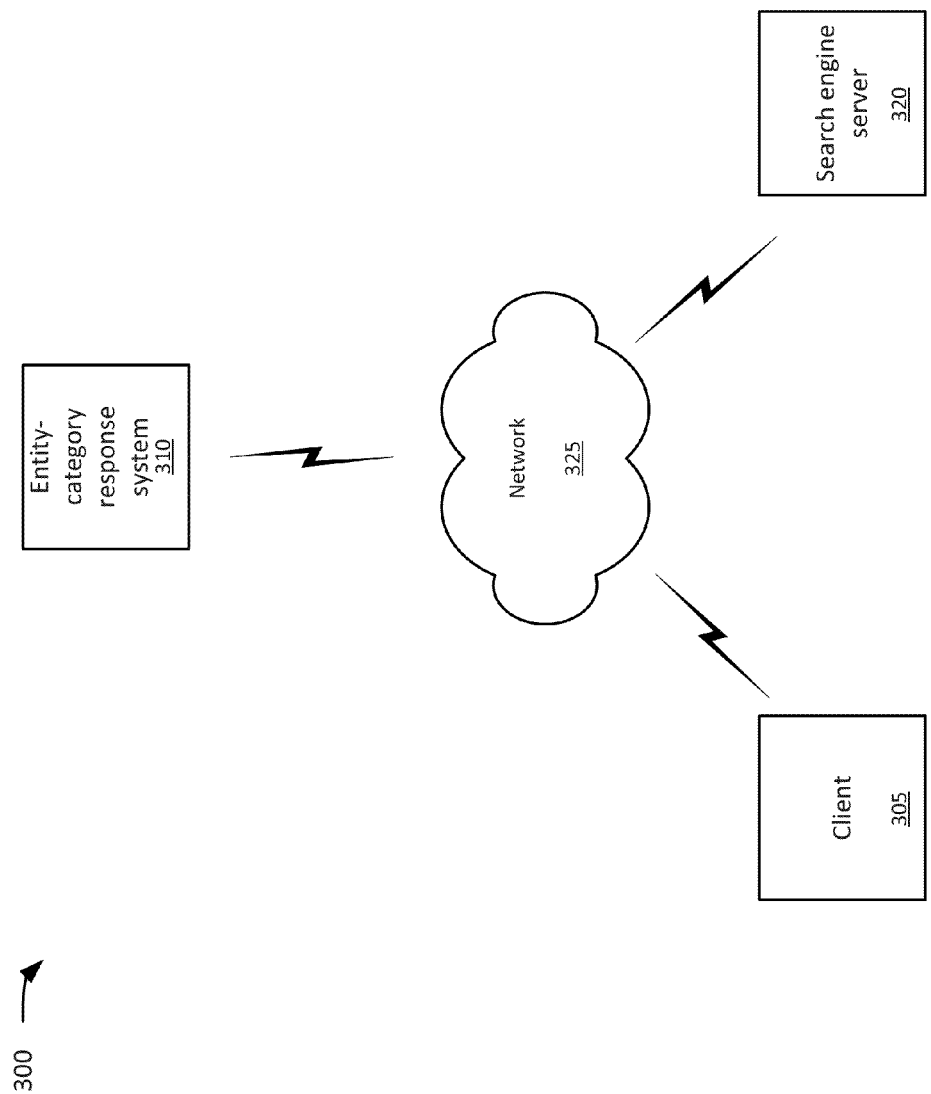
FIG. 3 illustrates an example environment in which systems and/or methods described herein may be implemented.

FIG. 3 is a diagram of an example environment 300 in which systems and/or methods described herein may be implemented. Environment 300 may include client 305 and servers, such as entity-category response system 310 and search engine server 320, herein collectively referred to as "servers 310-320," connected to network 325. One client 305 and two servers 310-320 have been illustrated as connected to network 325 for simplicity. In practice, environment 300 may include additional clients and/or servers or fewer clients and/or servers. Also, in some instances, a client may perform a function of a server, and a server may perform a function of a client.

Client 305 may implement one or more functions of user device 110. Client 305 may be a mobile telephone, a personal computer, a personal digital assistant (PDA), a tablet computer, a laptop, or any other type of computation or communication device. Client 305 may include audio input/output devices that allow a user to communicate with client 305 via speech. For example, these audio input/output devices may include one or more microphones and/or one or more speakers. Client 305 may also include one or more visual input/output devices, such as one or more cameras and/or one or more display screens that are capable of presenting a user interface via which a user may interact.

Servers 310-320 may each be implemented as a single server device or a collection of server devices that may be co-located or remotely located. Additionally, or alternatively, servers 310-320 may be implemented together within a single, common server device or a single, common collection of server devices.

Entity-category response system 310 may classify a query as an entity-triggering query or a description-triggering query. As described in further detail below, entity-category response system 310 may classify the query based on analyzing search results associated with the query (e.g., search results determined to be relevant to the query by a search engine system). These search results may be received, from search engine server 320, in response to searches performed by search engine server 320 using the query. Entity-category response system 310 may provide appropriate responses to the query, based on analyzing the search results associated with the query.

In some implementations, an entity-triggering query is a query for which a response includes an entity identifier. For example, an entity-triggering query may be a query for which an entity identifier is provided as an answer to the query. In some implementations, a description-triggering query is a query for which a response includes a natural language description, such as a phrase or sentence describing an entity identified by the description-triggering query. For example, a description-triggering query may be a query for which a natural language snippet associated with one or more search results is provided as an answer to the query.

Search engine server 320 may implement a search engine that receives queries, e.g., from client 305 and/or from entity-category response system 310. Search engine server 320 may provide one or more search results in response to the received queries. The search results may include information regarding one or more documents, such as a link or links to the one or more documents. Examples of documents include, for example, a web site, a file, a combination of files, one or more files with embedded links to other files, a news group posting, a news article, a blog, a business listing, an electronic version of printed text, a web advertisement, and an e-mail. In the context of the Internet, a web page is a common document. Documents often include textual information and may include embedded information, such as meta information, images, hyperlinks, etc., and/or embedded instructions, such as script instructions, etc.

The search results may also include one or more snippets, for example, text that is derived from text included in one or more documents. For example, a particular snippet may include a portion of text from a particular document. Search engine server 320 may identify the portion of text based on relevance of the text to a particular search query. For example, search engine server 320 may identify a portion of text, of a document, that includes terms that are more relevant to the search query than terms of other portions of text of the document. As mentioned above, entity-category response system 310 may use the search results, received from search engine server 320, when outputting information regarding a search result that is responsive to the query.

Additional servers, configured to perform other functions, may also be implemented in environment 300. The additional servers may provide, for example, web content, payment services, shopping services, social networking services, etc.

Network 325 may include any type of network, such as a local area network (LAN), a wide area network (WAN), a telephone network (e.g., a Public Switched Telephone Network (PSTN) or a cellular network), an intranet, the Internet, or a combination of networks. Client 305 and servers 310-320 may connect to network 325 via wired and/or wireless connections. In other words, client 305 and/or any of servers 310-320 may connect to network 325 via a wired connection, a wireless connection, or a combination of a wired connection and a wireless connection.

Figure 4:
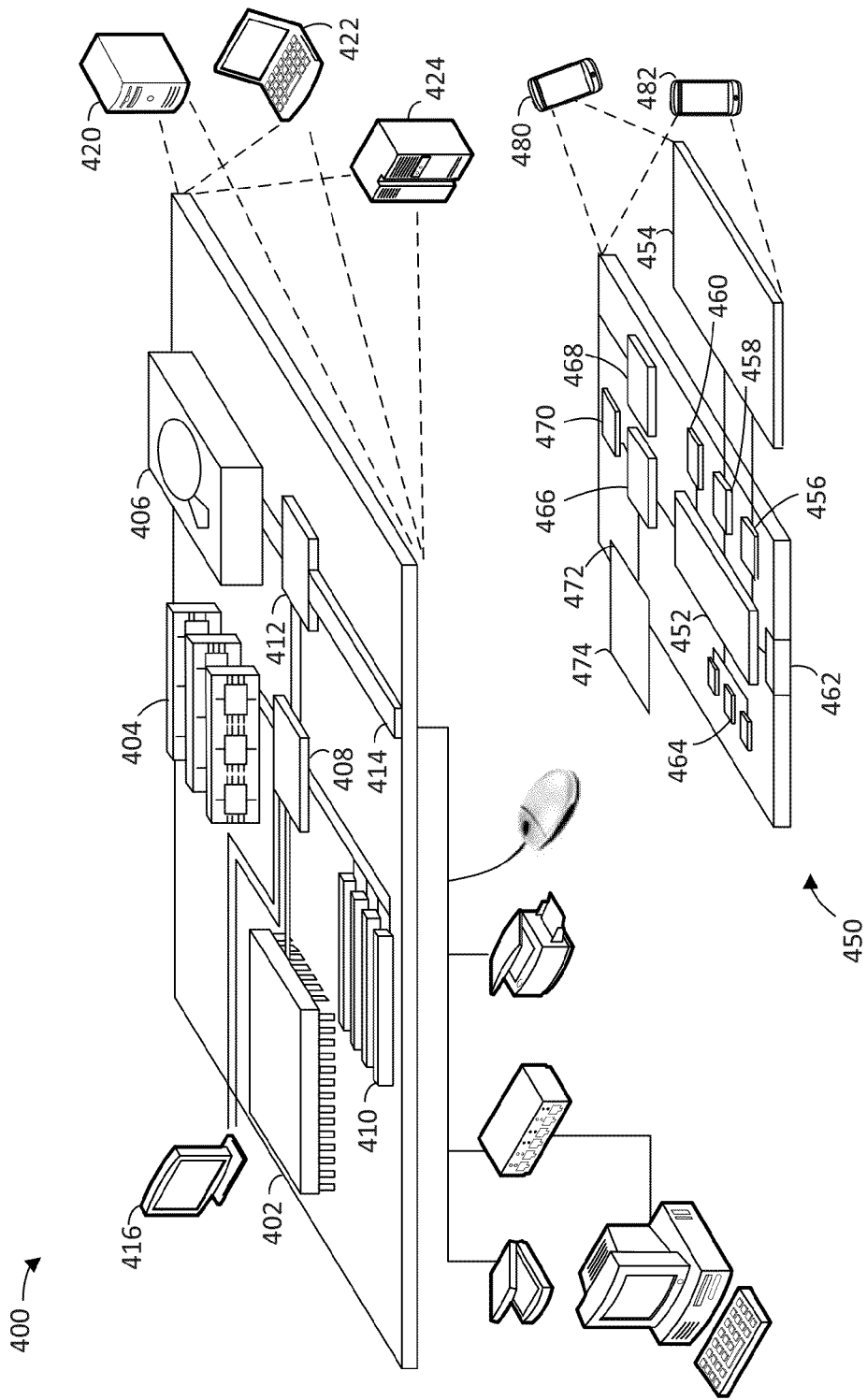
FIG. 4 shows an example of a generic computer device and a generic mobile computer device according to one or more implementations.

FIG. 4 shows an example of a generic computing device 400 and a generic mobile computing device 450, which may be used with the techniques described here. Computing device 400 and mobile computing device 450 may correspond to, for example, any of client 305 and/or servers 310-320. Each of client 305 or servers 310-320 may include one or more computing devices 400, mobile computing devices 450, or components of computing device 400 and/or mobile computing device 450.

Computing device 400 is intended to represent various forms of digital computers, such as laptops, desktops, workstations, personal digital assistants, servers, blade servers, mainframes, and other appropriate computers. Mobile computing device 450 is intended to represent various forms of mobile devices, such as personal digital assistants, cellular telephones, smart phones, and other similar computing devices. The components shown in FIG. 4, their connections and relationships, and their functions, are meant to be examples only, and are not meant to limit implementations described and/or claimed in this document.

Computing device 400 may include a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. Processor 402 can process instructions for execution within the computing device 400, including instructions stored in the memory 404 or on storage device 406 to display graphical information for a graphical user interface ("GUI") on an external input/output device, such as display 416 coupled to high speed interface 408. In some implementations, multiple processors and/or multiple buses may be used, as appropriate, along with multiple memories and types of memory. Also, multiple computing devices 400 may be connected, with each device providing portions of the necessary operations, e.g., as a server bank, a group of blade servers, or a multi-processor system, etc.

Memory 404 stores information within the computing device 400. In some implementations, memory 404 includes a volatile memory unit or units. In some implementations, memory 404 includes a non-volatile memory unit or units. The memory 404 may also be another form of computer-readable medium, such as a magnetic or optical disk. A computer-readable medium may be defined as a non-transitory memory device. A memory device may include space within a single physical memory device or spread across multiple physical memory devices.

Storage device 406 is capable of providing mass storage for the computing device 400. In some implementations, storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 404, storage device 406, or memory on processor 402.

High speed controller 408 manages bandwidth-intensive operations for the computing device 400, while low speed controller 412 manages lower bandwidth-intensive operations. Such allocation of functions is exemplary only. In some implementations, high-speed controller 408 is coupled to memory 404, display 416, e.g., through a graphics processor or accelerator, and to high-speed expansion ports 410, which may accept various expansion cards. In these implementations, low-speed controller 412 is coupled to storage device 406 and low-speed expansion port 414. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

Computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device, such as mobile computing device 450. Each of such devices may contain one or more of computing devices 400, 450, and an entire system may be made up of multiple computing devices 400, 450 communicating with each other.

Mobile computing device 450 may include a processor 452, memory 464, an input/output ("I10") device such as a display 454, a communication interface 466, and a transceiver 468, among other components. Mobile computing device 450 may also be provided with a storage device, such as a microdrive or other device, to provide additional storage. Each of the components 450, 452, 464, 454, 466, and 468 are interconnected using various buses, and several of the components may be mounted on a common motherboard or in other manners as appropriate.

Processor 452 can execute instructions within mobile computing device 450, including instructions stored in memory 464. Processor 452 may be implemented as a chipset of chips that include separate and multiple analog and digital processors. Processor 452 may provide, for example, for coordination of the other components of mobile computing device 450, such as control of user interfaces, applications run by mobile computing device 450, and wireless communication by mobile computing device 450.

Processor 452 may communicate with a user through control interface 458 and display interface 456 coupled to a display 454. Display 454 may be, for example, a Thin-Film-Transistor Liquid Crystal Display ("TFT LCD") or an Organic Light Emitting Diode ("OLED") display, or other appropriate display technology. Display interface 456 may include appropriate circuitry for driving display 454 to present graphical and other information to a user. Control interface 458 may receive commands from a user and convert them for submission to the processor 452. In addition, an external interface 462 may be in communication with processor 452, so as to enable near area communication of mobile computing device 450 with other devices. External interface 462 may provide, for example, for wired communication, or for wireless communication, and in some instances, multiple interfaces may be used.

Memory 464 stores information within mobile computing device 450. Memory 464 can be implemented as one or more of a computer-readable medium or media, a volatile memory unit or units, or a non-volatile memory unit or units. Expansion memory 474 may also be provided and connected to mobile computing device 450 through expansion interface 472, which may include, for example, a Single In Line Memory Module ("SIMM") card interface. Such expansion memory 474 may provide extra storage space for device 450, or may also store applications or other information for mobile computing device 450. Specifically, expansion memory 474 may include instructions to carry out or supplement the processes described above, and may include secure information also. Thus, for example, expansion memory 474 may be provide as a security module for mobile computing device 450, and may be programmed with instructions that permit secure use of device 450. In addition, secure applications may be provided via the SIMM cards, along with additional information, such as placing identifying information on the SIMM card in a non-hackable manner.

Expansion memory 474 may include, for example, flash memory and/or NVRAM memory. In some implementations, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Mobile computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver. In addition, Global Positioning System ("GPS") receiver module 470 may provide additional navigation- and location-related wireless data to mobile computing device 450, which may be used as appropriate by applications running on mobile computing device 450.

Mobile computing device 450 may also communicate audibly using audio codec 460, which may receive spoken information from a user and convert it to usable digital information. Audio codec 460 may likewise generate audible sound for a user, such as through a speaker, e.g., in a handset of mobile computing device 450. Such sound may include sound from voice telephone calls, may include recorded sound, e.g., voice messages, music files, etc., and may also include sound generated by applications operating on mobile computing device 450.

Mobile computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described herein can be realized in digital electronic circuitry, integrated circuitry, specially designed application specific integrated circuits ("ASICs"), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or m assembly/machine language. As used herein, the terms "machine-readable medium" and "computer-readable medium" refer to any non-transitory apparatus and/or device, e.g., magnetic discs, optical disks, memory, Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, e.g., a cathode ray tube ("CRT") or liquid crystal display ("LCD") monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a LAN, a WAN, and the Internet.

Figure 5:
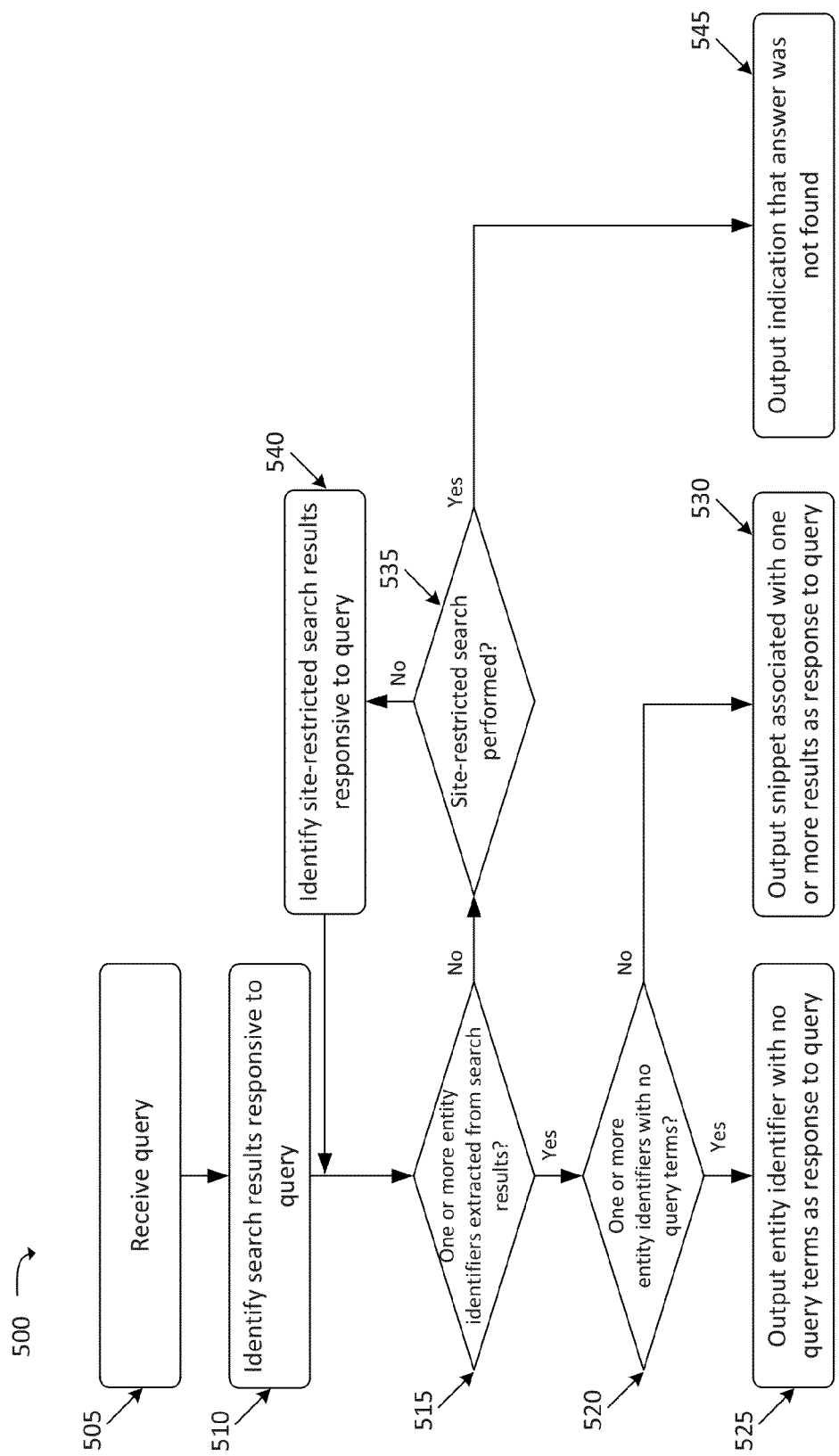
FIG. 5 illustrates a flowchart of an example process for generating a response to a query based on whether the query is a name-triggering query or a description-triggering query, according to one or more implementations described herein.

FIG. 5 illustrates a flowchart of an example process 500 for classifying a query as an entity-triggering query or a description-triggering query and generating a response to the query based on the classification of the query. In some implementations, process 500 may be performed by entity-category response system 310. In some implementations, process 500 may be performed by one or more other devices instead of, or possibly in conjunction with, entity-category response system 310.

Process 500 may include receiving a query (block 505). For example, entity-category response system 310 may receive a query from a client device, such as client 305. The query may be received by client 305 via audio input, text input, or via any other technique.

Process 500 may also include identifying search results that are responsive to the query (block 510). For example, entity-category response system 310 may receive search results from search engine server 320 that are responsive to the query received at block 505. In some implementations, entity-category response system 310 may provide some, or all, of the terms of the query to search engine server 320, and receive the search results from search engine server 320. In some implementations, entity-category response system 310 may receive only a particular quantity of search results from search engine server 320, and/or only perform additional processing on a particular quantity of the search results received from search engine server 320. For example, the search results may be scored based on one or more of a variety of factors, such as relevance to the query, quality of documents associated the search results, traffic to and/or from documents associated with the search results, or any other factor. In some implementations, entity-category response system 310 may receive only the top 10, 100, 1,000, etc., highest-scoring search results. Additionally, or alternatively, in some implementations, entity-category response system 310 may perform additional processing—e.g., perform blocks any of 515, 520, etc.—based on only the top 10, 100, 1,000, etc. highest-scoring search results, of the received search results. That is, in some implementations, entity-category response system 310 may perform additional processing using only a proper subset of (e.g., fewer than all of) the search results that were identified as being responsive to the query.

Figure 6:
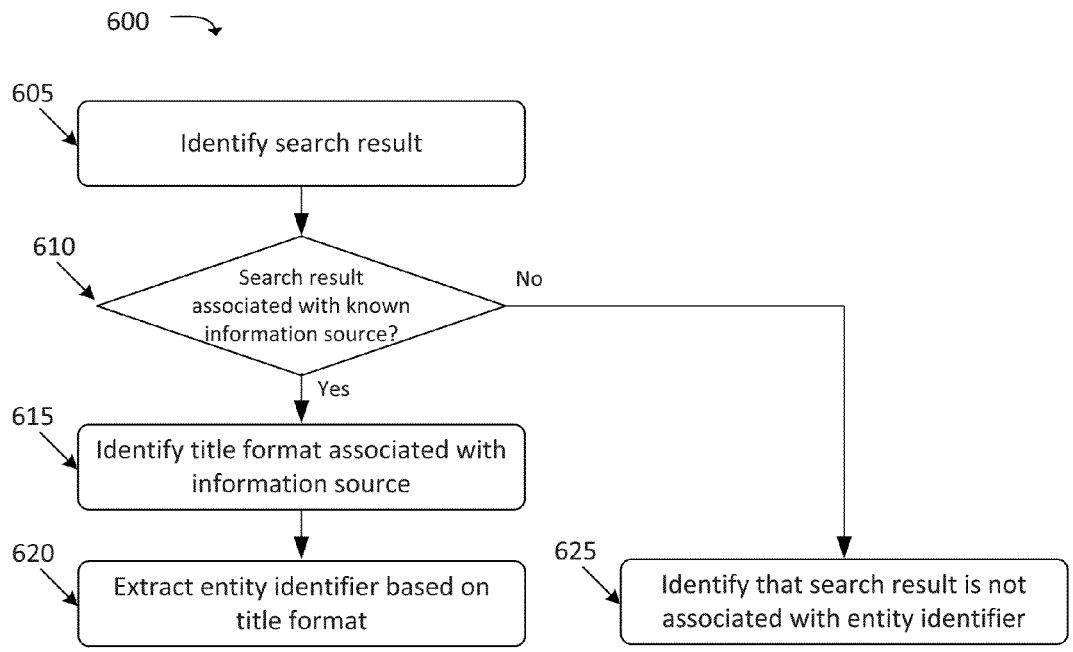
FIG. 6 illustrates a flowchart of an example process for identifying an entity identifier associated with a search result, according to one or more implementations described herein.

Process 500 may further include analyzing the search results to determine whether entity identifiers can be extracted from the search results (block 515). Process 600, described below with respect to FIG. 6, is an example of how entity-category response system 310 may analyze the search results at block 515, in some implementations. For example, and as described in more detail below, entity-category response system 310 may analyze the search results identified at block 510 in order to extract one or more entity identifiers associated with one or more of the search results. In some implementations, an entity identifier may be, for example, extracted from a title of a search result that is associated with a known source of information. Such known sources of information may include web sites, such as publicly accessible web sites that store information. These publicly accessible web sites may include web sites that store information regarding a variety of entities, such as people, companies, movies, songs, music artists, and/or any other entities. Known sources of information may additionally, or alternatively, include any other information source, such as a private database, a public database, a telephone directory, or any other information source.

Process 500 may additionally include determining whether one or more entity identifiers were extracted (block 515). If one or more entity identifiers were extracted (block 515—YES), then process 500 may include determining whether one or more of the entity identifiers is an entity identifier that does not match (e.g., does not include) any terms of the query (block 520). For example, the query received at block 505 may include one or more query terms. The entity-category response system 310 may compare the extracted one or more entity identifiers with the query terms. Based on the comparison, in some scenarios, the entity-category response system 310 may determine that one or more of the entity identifiers extracted at block 515 includes one or more of the query terms, while in some scenarios, the entity-category response system 310 may determine that one or more of the entity identifiers extracted at block 515 include none of the query terms.

If the entity identifiers include one or more terms of the query, the entity-category response system 310 may classify the query as a description-triggering query—e.g., a query for which an appropriate response includes a description of a topic. If the entity identifiers do not include one or more terms of the query (e.g., if none of the entity identifiers include any query terms), the entity-category response system 310 may classify query as an entity-triggering query—e.g., a query for which an appropriate response includes information regarding an entity identifier. For example, it may be unlikely that an appropriate response to a query would be entity identifier if the query already includes that entity identifier, because the entity identifier would not be providing new information. On the other hand, it may be likely that an appropriate response for a query would include an entity identifier if the query does not include that entity identifier.

The entity-category response system 310 may determine whether one or more of, or each of, extracted entity identifiers matches one or more of the query terms. For example, for each of the extracted entity identifiers, the entity-category response system 310 may determine whether there are any terms of an entity identifier that match (e.g., are the same as, or are within a threshold similarity of) any term of the query. As additional examples, the entity-category response system 310 may determine whether an entity identifier matches query terms by determining whether all of the terms of an entity identifier occur in the query terms, or whether an entire entity identifier is included in the query (e.g., with all the terms of the entity identifier occurring in a contiguous portion of the query, in the same unbroken sequence that they occur in the entity identifier).

In some implementations, the entity-category response system 310 determines whether there is at least one entity identifier in the set of extracted entity identifiers that does not match the query terms. For example, the entity-category response system 310 may determine whether there is at least one extracted entity identifier for which none of the query terms occur in the entity identifier. In some implementations, the entity-category response system 310 selects a subset (which may be a proper subset) of the query terms as significant terms, and determines whether any of the significant terms in the subset match terms in the entity identifiers.

As described further below, the entity-category response system 310 may classify queries based on the determination whether there is at least one entity identifier in the set of extracted entity identifiers that does not match the query terms. For example, when the entity-category response system 310 determines that at least one of the extracted entity identifiers does not include any of the query terms, the entity-category response system 310 classifies the query as an entity-triggering query. When the entity-category response system 310 determines that all of the extracted entity identifiers include at least one of the query terms, the entity-category response system 310 classifies the query as a description-triggering query.

In some implementations, when determining whether one or more of the extracted entity identifiers does not match (e.g., does not include) any terms of the query (at block 520), entity-category response system 310 may exclude insignificant words of the query and/or the entity identifier when making the determination. For example, when comparing the query terms with the extracted entity identifiers, the entity-category response system 310 may exclude "stop" words, such as "the," "and," "or," "of," "what," "who," and/or any other words in a predetermined list of insignificant words from the comparison. In some implementations, words that are not in the list of insignificant words may be considered to be significant words.

For example, assume that the query received at block 505 includes the phrase "What can you tell me about the song Stairway to Heaven?", and assume that a particular entity identifier extracted at block 515 includes the phrase "the greatest song in the world." When determining whether the particular entity identifier does not include any terms of the query according to some such implementations, entity-category response system 310 may exclude the term "the" for the purposes of making the determination. Thus, in some such implementations, entity-category response system 310 may determine that the particular entity identifier, that includes the phrase "the greatest song in the world," does not include any terms of the query "What can you tell me about the song Stairway to Heaven?", since entity-category response system 310 has excluded the term "the" when making the determination at block 520.

In some implementations, entity-category response system 310 may not exclude any of the terms included in the query and/or the entity identifiers when making the determination at block 520. In such implementations, and continuing with the example above, entity-category response system 310 may determine that the particular entity identifier, that includes the phrase "the greatest song in the world," includes one or more terms of the query "What can you tell me about the song Stairway to Heaven?", since the entity identifier includes the term "the," which is included in the query.

If one or more of the extracted entity identifiers does not include any terms of the query (block 520—YES), then process 500 may include outputting a particular entity identifier, that does not include query terms, as a response to the query (block 525). For example, assume that none of the entity identifiers extracted at block 515 include terms of the query received at 505. In such a scenario, entity-category response system 310 may identify a particular entity identifier, of the entity identifiers extracted at block 515, as a response to the query. In some implementations, entity-category response system 310 may identify a particular entity identifier extracted from a highest-scoring search result out of the search results identified at block 510—e.g., a search result, from among of the identified search results, that is most relevant to the query, has a highest measure of quality, is associated with a highest amount of traffic to/from a document associated with the search result, etc. In some implementations, entity-category response system 310 may identify an entity identifier that is extracted from any other source (e.g., an entity identifier that is extracted from the second highest-scoring search result, from the lowest-scoring search result, an arbitrary search result, etc.).

In some such implementations, entity-category response system 310 may identify a most frequently occurring entity identifier, out of the entity identifiers extracted at block 515. For example, assume that the entity identifier "the greatest song in the world" is extracted from a highest-scoring search result, and is extracted from one search result, and that the entity identifier "Led Zeppelin song" is extracted from two search results that are not the highest-scoring search result. In such implementations, entity-category response system 310 may select "Led Zeppelin song" as the response to the query, even though "Led Zeppelin song" is not associated with a highest-scoring search result.

In some instances, when multiple entity identifiers are extracted from the search results, the entity-category response system 310 determines that a plurality of the multiple entity identifiers do not match the query terms. In some implementations, the entity-category response system 310 selects, from among the plurality of entity identifiers that do not match the query terms, an entity identifier that was extracted from a highest-scoring search result of the identified search results. In addition, or as an alternative, in some implementations, the entity-category response system 310 counts, for each entity identifier in the plurality of entity identifiers, a number of the search results from which the entity identifier was extracted. The entity-category response system 310 selects, from among the plurality of entity identifiers, the entity identifier that was extracted from the highest number of the search results. The selected entity identifier is then provided in a response to the query (e.g., provided in a response and also indicated as an answer to the query).

Entity-category response system 310 may output information regarding the selected entity identifier. For example, entity-category response system 310 may provide an identification of the entity identifier, or other information associated with the entity identifier, to client 305. Additionally, or alternatively, entity-category response system 310 may store information associating the selected entity identifier with the query received at block 505. The information associating the selected entity identifier with the query may be used for any of a variety of purposes, such as identifying the selected entity identifier as a response to subsequently receiving query at a later time, or any other purpose.

If, on the other hand, each of the entity identifiers include at least one term of the query (block 515—YES and block 520—NO), then process 500 may include outputting a snippet associated with one or more of the search results as a response to the query (block 530). In some implementations, entity-category response system 310 may select a highest-scoring search result, from which an entity identifier was extracted at block 515. Entity-category response system 310 may identify a snippet associated with the selected search result. As described above, the snippet may include text that is derived from one or more documents associated with the search result.

In some implementations, when outputting a snippet, entity-category response system 310 may output only one or more full sentences (e.g., complete sentences) associated with a snippet. Additionally, or alternatively, entity-category response system 310 may output only full clauses associated with a snippet. That is, in some implementations, entity-category response system 310 may identify portions of a sentence that may themselves form full sentences. For example, in the sentence, "Billy is a boy, and he has a red cap," entity-category response system 310 may identify the clause "Billy is a boy," and entity-category response system 310 may further identify the clause "he has a red cap." In order to identify a full sentence and/or a full clause, entity-category response system 310 may use syntactical analysis, semantic analysis, character analysis, and/or any other type of technique. For instance, entity-category response system 310 may identify a full sentence based on the presence of sentence-ending punctuation, such as a period, a question mark, an exclamation point, or the like. Additionally, entity-category response system 310 may identify a full clause based on the presence of clause-ending punctuation, such as a comma, a semicolon, or the like. Additionally, or alternatively, entity-category response system 310 may identify a full sentence or a full clause based on the presence of an indication of a beginning of a sentence or a clause, such as one or more capital letters.

For instance, assume that entity-category response system 310 identifies the snippet "Star Wars is one of the highest-grossing movies of all time, after adjusting for inflation. It is the story of . . . . " In some implementations, entity-category response system 310 may output the following portion of the snippet: "Star Wars is one of the highest-grossing movies of all time, after adjusting for inflation," while omitting the portion of the snippet that is not a full sentence, e.g., "It is the story of . . . . "

In some scenarios, a snippet associated with a highest-scoring search result may not include any full sentences. In these scenarios, entity-category response system 310 may select a snippet associated with a search result from among the set of search results that are each associated with a snippet that includes one or more full sentences (e.g., a highest-scoring search result from the search results that are associated with a snippet that includes one or more full sentences, and/or any other search result that is associated with a snippet that includes one or more full sentences). In some implementations, if no such search results exist, entity-category response system 310 may output an indication that no response to the query was found. In some implementations, if no such search results exist, entity-category response system 310 may select a snippet associated with a highest-scoring search result, regardless of whether the snippet includes a full sentence.

In some implementations, entity-category response system 310 may select a snippet, regardless of whether the snippet includes one or more full sentences. Returning to a prior example, in some such implementations, entity-category response system 310 may output the snippet "Star Wars is one of the highest-grossing movies of all time, after adjusting for inflation. It is the story of . . . . " Entity-category response system 310 may output the selected snippet to, for example, client 305 without modification.

In some implementations, the entity-category response system 310 selects a response format with which to respond to a query based on the classification of the query, and provides a response according to the selected response format. The entity-category response system 310 may respond to entity-triggering queries using a response format that is distinct and different from response formats used for responding to description-triggering queries (e.g., response formats for entity-triggering and description-triggering queries can have different content, different formatting, different ordering of information, and/or other different aspects).

In some implementations, when the entity-category response system 310 classifies a query as an entity-triggering query, the entity-category response system 310 selects a response format that has been designated for queries classified as entity-triggering queries. The response format designated for entity-triggering queries can be a response format that is not designated for queries classified as description-triggering queries. For example, the selected response format can be a response format that is not used to respond to description-triggering queries, and is different from the response formats designated for description-triggering queries. For example, according to a response format designated for an entity-triggering query, an entity identifier may be provided, and the entity identifier may be designated as the answer to the query (e.g., without a natural language description or snippet being designated as an answer to the query).

In some implementations, when the entity-category response system 310 classifies a query as a description-triggering query, the entity-category response system 310 selects a response format that has been designated for queries classified as description-triggering queries. The response format designated for description-triggering queries can be a response format that is not designated for queries classified as entity-triggering queries. For example, the selected response format can be a response format that is not used to respond to entity-triggering queries, and is different from the response formats designated for entity-triggering queries. For example, according to a response format designated for an entity-triggering query, a snippet from a search result may be provided, and the snippet may be designated as the answer to the query (e.g., without an entity identifier being designated as the answer to the query).

If one or more entity identifiers were not extracted (block 515—NO) (e.g., if no entity identifiers are extracted), then process 500 may include determining whether a site-restricted search was performed (block 535). For example, entity-category response system 310 may determine whether the search results analyzed at block 515, were identified based on search parameters that specify a limited search space from which results may be selected. For example, a site-restricted search may designate that results are selected, for example, from only a portion of a document collection, from among resources hosted in a particular an Internet domain or set of Internet domains, or from a proper subset of multiple information sources from which results are selected for an unrestricted search. The restrictions for a site-restricted search may be implemented as search criteria other than the query terms submitted by a user, and may limit the search space for a search to one or more particular information sources, of a list of information sources. As discussed above, these particular information sources may include web sites, such as publicly available web sites that include publicly available information, private databases, public databases, or any other information source.

Entity-category response system 310 may determine whether a site-restricted search was performed (at block 535) when entity identifiers are not extracted from search results at block 515. Such situations may occur when the search results, analyzed at block 515, do not include search results from the one or more particular information sources. Such situations may also occur when a site-restricted search, described below with respect to block 540, does not yield any search results.

If a site-restricted search was not performed (block 515—NO and block 535—NO), then process 500 may include identifying site-restricted search results that are responsive to the query (block 540). For example, entity-category response system 310 may provide the query to search engine server 320, along with a request to perform a site-restricted search, e.g., a search that is restricted to one or more particular information sources, as mentioned above. In some implementations, entity-category response system 310 may provide the query to search engine server 320, along with a request to perform a site-restricted search that is restricted to multiple particular information sources.

In some implementations, entity-category response system 310 may provide the query to search engine server 320, along with a request to perform a site-restricted search that is restricted to one or more particular information sources, and may subsequently provide the query to search engine server 320, along with a request to perform a site-restricted search that is restricted to one or more other particular information sources if the first search did not yield any search results. In these implementations, entity-category response system 310 may rank the particular information sources, and request searches restricted to particular information sources in an order that is based on the ranking. Entity-category response system 310 may rank the particular information sources based on any criteria, and/or may receive ranking information that indicates the order. Entity-category response system 310 may identify one or more of search results, identified by search engine server 320 in response to the site-restricted search.

In some scenarios, search results from a site-restricted search may yield entity identifiers even though entity identifiers were not extracted from search results from a general or unrestricted search using the same query terms. For example, by performing a site-restricted search that selects results the Internet domain for one or more encyclopedia sites, encyclopedia entries may be obtained as search results. The content of the encyclopedia entries may have a known format (e.g., a known title format) which assists in extracting entity identifiers. Further, the content of the encyclopedia entries may have a level of quality or accuracy that is more consistent than, for example, Internet documents in general. While same encyclopedia entries may appear in search results for a general Internet search (e.g., a search over multiple Internet domains or all Internet domains), the encyclopedia entries may be buried in a large set of search results, and thus may not be among a set of top-ranked search results from which the entity-category response system 310 initially attempts to extract entity identifiers.

In some implementations, identifying search results that are responsive to the query may include identifying search results that are each associated with one of a plurality of different information sources. In these instances, the entity-category response system 310 may identify a proper subset of the search results (e.g., fewer than all of the search results), where the proper subset includes only search results that are associated with a particular information source or set of information sources. Entity identifiers are then extracted from the proper subset of the search results (e.g., from only the results in the proper subset). An Internet domain can be specified, and the entity-category response system 310 can be select search results that each reference (e.g., identify or include a link to) a resource that is hosted in the Internet domain (e.g., where the search results may reference different resources in the Internet domain). In some implementations, the Internet domain is a second-level domain (e.g., "example.com") or higher level domain, rather than a top-level domain (e.g., ".gov" or ".com").

Process 500 may further include analyzing the search results identified at block 540 to determine whether one or more entity identifiers can be extracted from the search results (block 515). As similarly described above, entity-category response system 310 may, for example, analyze the search results identified at block 540 in order to extract one or more entity identifiers associated with one or more of the search results (e.g., entity identifiers included in the one or more search results or in resources referenced by the one or more search results).

If no entity identifiers were extracted and a site-restricted search was performed (block 515—NO and block 535—YES), then process 500 may include outputting an indication that an answer to the query was not found (block 545). As mentioned above, such a situation may occur when no search results are identified (at block 540) based on a site-restricted search. Entity-category response system 310 may, for example, provide the indication to client 305. Client 305 may output an indication, such as by audibly and/or visually presenting a phrase, such as "I don't know." Additionally, or alternatively, client 305 may prompt a user for additional input, such as an alternative query.

While a description of example process 500 was presented above, some implementations may include variations of process 500. For example, in some implementations, entity-category response system 310 may identify site-restricted search results that are responsive to a query (at block 540) without first determining whether entity identifiers can be extracted from search results that are identified based on a search that is not a site-restricted search.

FIG. 6 illustrates a flowchart of an example process 600 for identifying an entity identifier associated with a search result. As mentioned above, process 600 may correspond to block 515 of process 500. In some implementations, process 600 may be performed by entity-category response system 310. In some implementations, process 600 may be performed by one or more other components instead of, or possibly in conjunction with, entity-category response system 310.

Process 600 may include identifying a particular search result (block 605). For example, entity-category response system 310 may identify a particular search result identified at block 510 and/or at block 540. As discussed above, the search result may include information identifying a document, such as information identifying a location of a web page, a title of the web page, or the like, and a snippet of text extracted from the document.

Process 600 may also include determining whether the particular search result is associated with a known information source (block 610). For example, entity-category response system 310 may determine whether the particular search result, e.g., the document associated with the particular search result, is associated with (e.g., is provided by or is accessible from) a particular known information source. Entity-category response system 310 may make this determination based on a domain at which the document, associated with the search result, is located. For instance, assume that a particular known information source is a web site located at the Uniform Resource Locator (URL) "http://www.source-a.com" and that a particular search result is associated with the URL "http://www.source-a.com/Star wars." Entity-category response system 310 may determine (at block 610) whether the domain associated with the particular search result, i.e., "source-a.com," is associated with a particular known information source. That is, in some implementations, entity-category response system 310 may compare the domain associated with the particular search result to a list of domains associated with known information sources.

If the particular search result is associated with (e.g., is provided by or received from) a known information source (block 610—YES), then process 600 may include identifying a title format associated with the information source (block 615). Identifying the title format associated with a search result or document may include identifying an Internet domain associated with the search result or document, and identifying a title format associated with the Internet domain. Continuing with the example above, assume that "www-.source-a.com" is a known information source. In this example, entity-category response system 310 may determine that the search result associated with the URL, "http://www.source-a.com/Star_wars," is associated with a known information source because, for example, the URL includes "www.source-a.com."

The search result may be associated with a title (e.g., the search result, or a resource referenced by the search result, may include the title). The title may be, for example, a title of a document, such as a web page, associated with the search result. In some examples, the title may be included in Hypertext Markup Language (HTML) <title> tag associated with the document. For example, the title associated with the document located at the URL "http://www.source-a.com/Star_wars" may be "Star Wars—Source A, the free information source."

Entity-category response system 310 may identify (at block 615) a title format associated with the information source associated with the search result identified at block 605. Different information sources may be associated with different title formats. An information source may be associated with a title format due to, for example, data designating the title format as corresponding to the information source, where the data is stored by entity-category response system 310 or another system. A title format may indicate standardized characteristics shared by multiple of, or substantially all of, the titles of documents provided by the information source. A title format may indicate one or more of, for example, delimiters, common text, data fields, ordering of title components, and other information.

For example, the information source "www.source-a.com" may be associated with the title format "X—Source A, the free information source," where "X" represents an entity identifier (e.g., X is a field that is populated with one or more entity identifiers in document titles). As another example, the information source "www.source-b.com" may be associated with the title format "X (Y)—Source B," where "Y" represents a year associated with the entity identifier, e.g., a release date associated with a movie. As yet another example, the information source "www.source-c.com" may be associated with the title format "X—Source C." While some examples of title formats are presented here, any other title format is possible in practice, for these information sources or for any other information sources.

In some implementations, entity-category response system 310 may receive information regarding title formats from a user, such as an administrator. In some implementations, entity-category response system 310 may automatically identify title formats associated with one or more information sources. For example, entity-category response system 310 may analyze multiple documents associated with a particular information source, identify a pattern based on commonalities among the documents, and identify a title format based on the pattern.

Process 600 may further include extracting the entity identifier based on the title format (block 620). For example, assume that the identified search result is associated with the title "Star Wars—Source A, the free information source," and is associated with the title format "X—Source A, the free information source." Entity-category response system 310 may identify the entity identifier based on the title format by, for example, omitting any terms in the title that are not the entity identifier. In some such implementations, entity-category response system 310 may omit the"—Source A, the free information source" from the above example title. Thus, the extracted entity identifier may be "Star Wars."

If, on the other hand, the particular search result is not associated with a known information source (block 610—NO), then process 600 may include identifying that the particular search result is not associated with the entity identifier.

Figure 7:
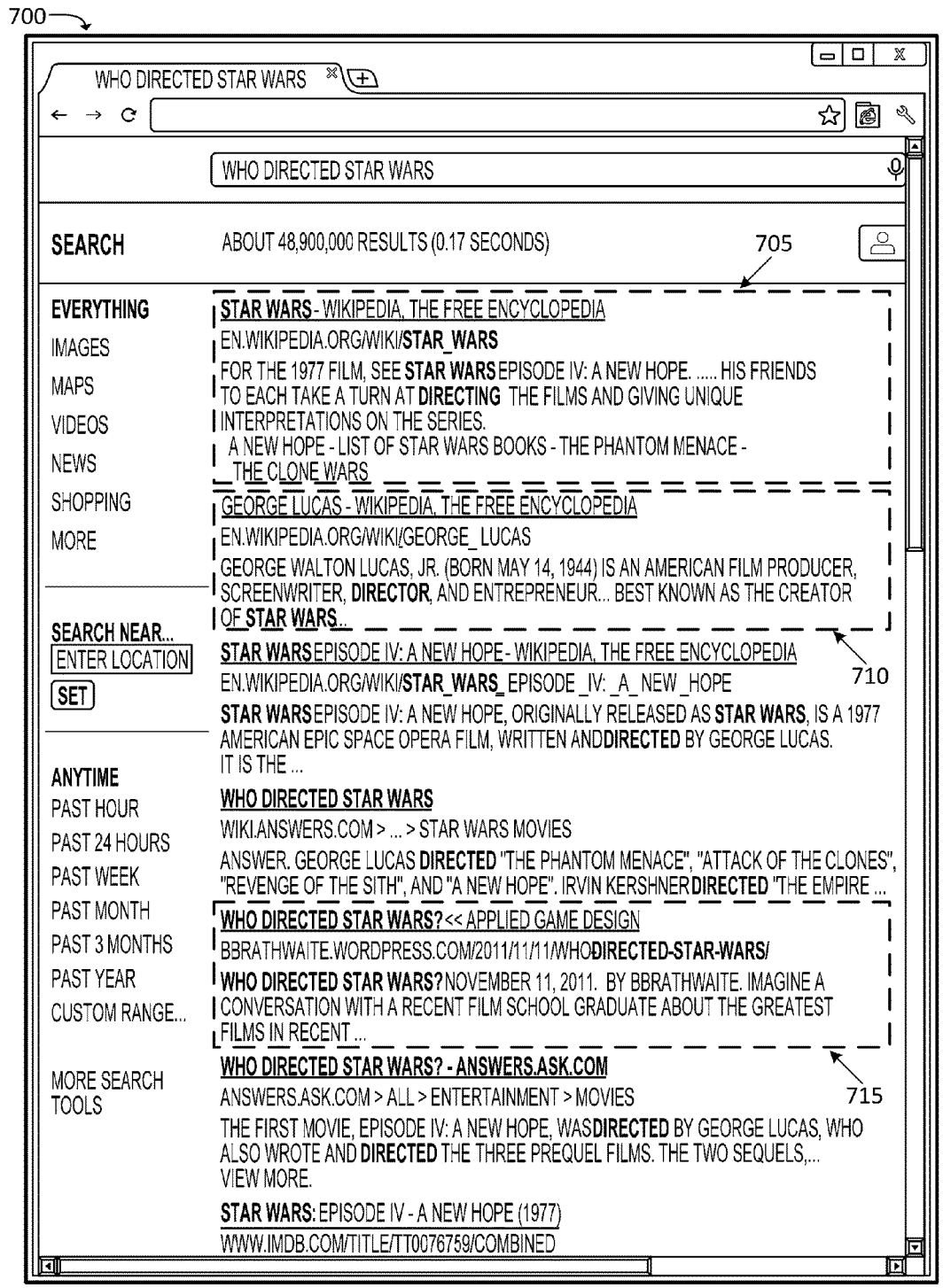
FIGS. 7-10 illustrate example documents according to one or more implementations described herein.
Figure 8:
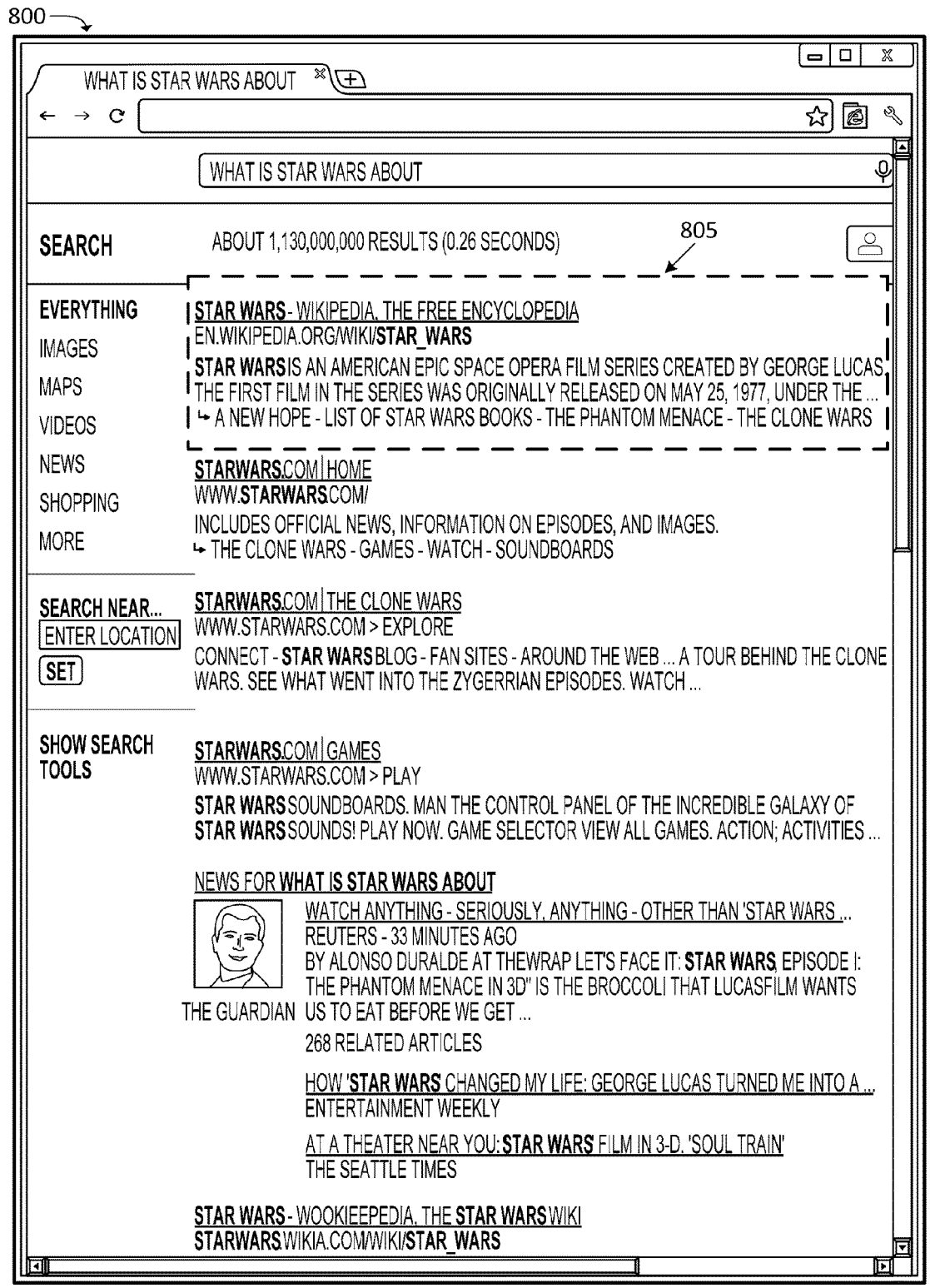

FIGS. 7 and 8 illustrate example documents 700 and 800. FIGS. 7 and 8 are described below in the context of examples of the processing of processes 500 and/or 600, of FIGS. 5 and/or 6, respectively. FIG. 7 illustrates an example associated with an entity-triggering query, while FIG. 8 illustrates an example associated with a description-triggering query.

Document 700, shown in FIG. 7, illustrates an example of search results associated with the query "Who directed Star Wars?" For example, these search results may be some or all of the search results identified at block 510 of process 500.

Search results 705 and 710 are examples of search results that are associated with known information sources. For example, both of search results 705 and 710 are associated with "www.source-a.com." Search result 715 is an example of a search result that is not associated with any of a predetermined set of a known information sources. For example, the domain "wordpress.com," with which search result 715 is associated, may, in some implementations, not be associated with a known information source.

Entity-category response system 310 may extract entity identifiers from search results 705 and 710, since search results 705 and 710 are each associated with a known information source. For instance, entity-category response system 310 may extract, at block 515 of process 500, the entity identifier "Star Wars" from search result 705, and the entity identifier "George Lucas" from search result 710. In some implementations, entity-category response system 310 does not extract an entity identifier from search result 715, since search result 715 is not associated with a known information source or known title format. Entity-category response system 310 may select, at block 525, the entity identifier "George Lucas" as the response to the query, since the entity identifier "George Lucas" does not include any significant terms of the query.

Document 800, shown in FIG. 8, may illustrate an example of search results associated with the query "What is Star Wars about?" For example, these search results may be some or all of the search results identified at block 510 of process 500. Search result 805 may be an example of a search result that is associated with a known information source. For example, search result 805 may be associated with "www.source-a.com."

Entity-category response system 310 may extract an entity identifier from search result 805, since search result 805 is associated with a known information source. For instance, entity-category response system 310 may extract, at block 515 of process 500, the entity identifier "Star Wars" from search result 705. Entity-category response system 310 may identify that the extracted entity identifiers—e.g., the entity identifier "Star Wars"—each include at least one significant term of the query. Entity-category response system 310 may select, at block 530, a full sentence of a snippet associated with search result 805 as the response to the query. For example, entity-category response system 310 may select the sentence "Star Wars is an American epic space opera film series created by George Lucas" as a response to the query.

Figure 9:
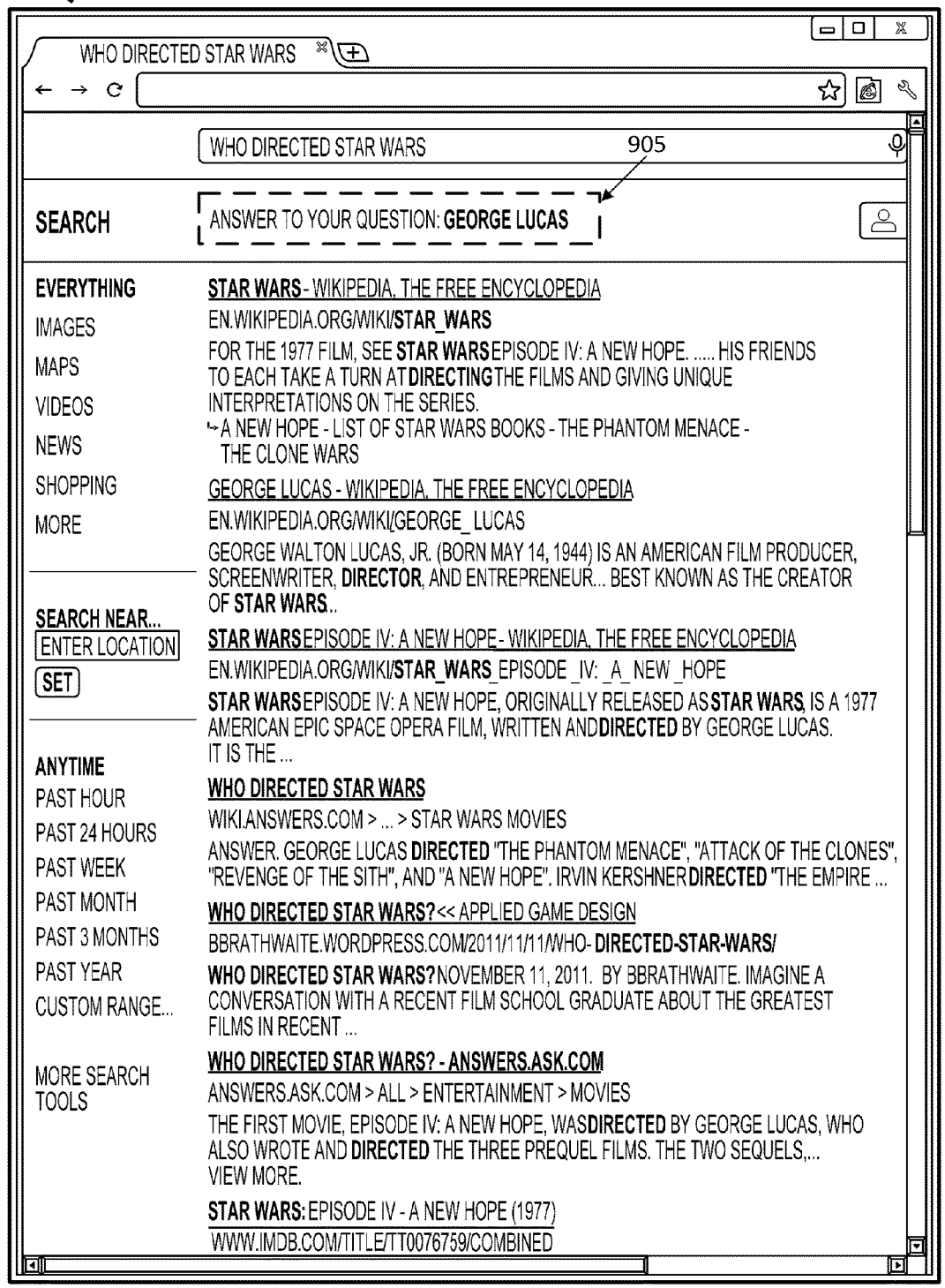
Figure 10:
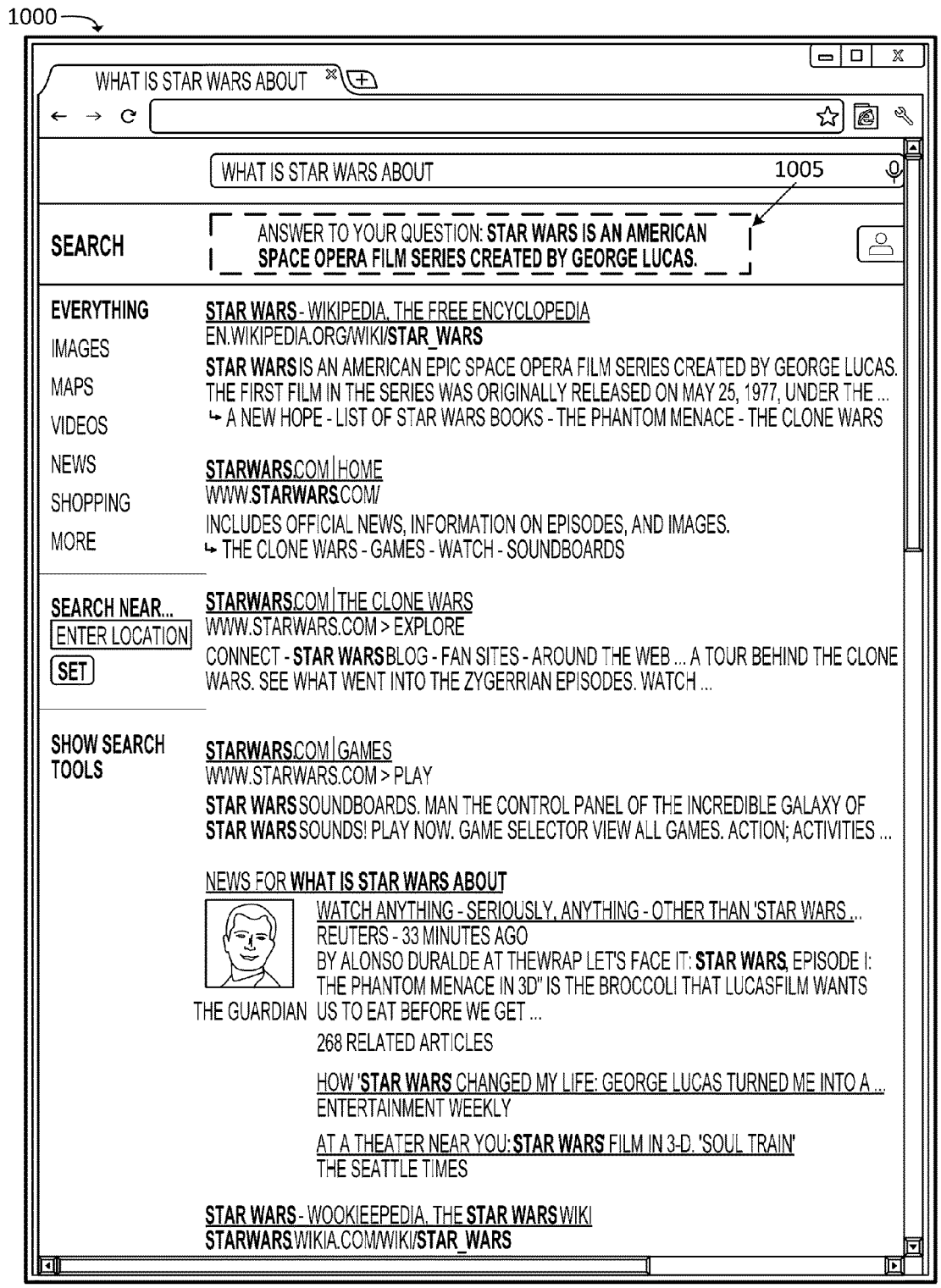

As mentioned above, in some implementations, client 305 may audibly present responses to queries. For example, client 305 may speak the responses using, for example, a text-to-speech technique. Additionally, or alternatively, client 305 may visually present responses to queries. For example, client 305 may visually present search result documents that include information regarding responses to queries. FIGS. 9 and 10 illustrate example documents 900 and 1000, which may be examples of documents via which client 305 may visually present responses to entity-triggering queries and/or description-triggering queries.

For example, document 900 may be associated with the above-discussed entity-triggering query "Who directed Star Wars?" Document 900 may include display area 905, which provides a response, associated with the entity "George Lucas," to the entity-triggering query. In some implementations, display area 905 may be located in a visually prominent location, such as above a list of search results that are responsive to the entity-triggering query. In some implementations, a font associated with display area 905 may be different from a font associated with a list of search results that are responsive to the entity-triggering query. For example, the font associated with display area 905 may be a larger size and/or a different color from one or more fonts associated with the list of search results.

Document 1000 may be associated with the above-discussed description-triggering query "What is Star Wars about?" Document 1000 may include display area 1005, which provides a response, which includes the description "Star Wars is an American epic space opera film series created by George Lucas," to the description-triggering query. In some implementations, display area 1005 may be located in a visually prominent location, such as above a list of search results that are responsive to the description-triggering query. In some implementations, a font associated with display area 1005 may be different from a font associated with a list of search results that are responsive to the description-triggering query. For example, the font with which text is displayed in display area 1005 may be a larger size and/or a different color from one or more fonts associated with the list of search results.

As illustrated in FIGS. 9 and 10, an answer region, such as display area 905 or display area 1005, can be provided in responses to queries classified as entity-triggering queries or description-triggering queries. The answer region can be separate from search results, and may be provided in addition to or instead of search results. In a response to a query classified as an entity-triggering query, an entity identifier may be the only answer to the query provided in the answer region (e.g., in display area 905). In a response to a query classified as a description-triggering query, a snippet from one of the search results may be the only answer to the query provided in the answer region (e.g., in display area 1005).

Some implementations, described herein, may allow one or more devices to classify queries as entity-triggering queries and/or description-triggering queries. Furthermore, one or more devices of some implementations may be configured to provide responses, that are associated with entities, in response to entity-triggering queries, and/or to provide responses, that are associated with descriptions, in response to description-triggering queries.

The forgoing description provides illustration and description, but is not intended to be exhaustive or to limit the implementations to the precise form disclosed. Modifications and variations are possible in light of the above description or may be acquired from practice of the implementations. For example, while series of blocks have been described with regard to FIGS. 5 and 6, the order of the blocks may be modified in other implementations. Further, nondependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a computer processor, a query that includes one or more query terms;
    extracting, by the computer processor, one or more entity identifiers from one or more search results that are responsive to the query;
    determining, by the computer processor, whether all of the extracted entity identifiers match or do not match at least one of the one or more query terms; and
    classifying the query as a description-triggering query or as an entity-triggering query, the query being classified as a description-triggering query based on determining that all of the extracted entity identifiers match the at least one of the one or more query terms, or the query being classified as an entity-triggering query based on determining that all of the extracted entity identifiers do not match the at least one of the one or more query terms;
    wherein a description triggering query is a query for which a natural language snippet associated with one or more of the search results is provided as an answer to the query, and wherein an entity-triggering query is a query for which an entity identifier that does not match one or more of the query terms is provided as an answer to the query.

2. The method of claim 1, comprising:
    based on classifying the query as the entity-triggering query, selecting a response format designated for queries classified as entity-triggering queries, wherein the selected response format is not designated for queries classified as description-triggering queries; and
    providing a response to the query using the selected response format.

3. The method of claim 1, comprising:
    based on classifying the query as the description-triggering query, selecting a response format designated for queries classified as description-triggering queries, wherein the selected response format is not designated for queries classified as entity-triggering queries; and
    providing a response to the query using the selected response format.

4. The method of claim 1, wherein:
    extracting one or more entity identifiers from the one or more search results comprises extracting multiple entity identifiers from the one or more search results.

5. The method of claim 4, comprising:
    determining that a plurality of entity identifiers in the extracted multiple entity identifiers do not include any of the one or more query terms;
    selecting, from among the plurality of entity identifiers, an entity identifier that was extracted from a highest-scoring search result of the identified one or more search results; and
    indicating that the selected entity identifier is the answer to the query.

6. The method of claim 4, comprising:
    determining that a plurality of entity identifiers in the extracted multiple entity identifiers do not include any of the one or more query terms;
    counting, for each entity identifier in the plurality of entity identifiers, a number of the one or more search results from which the entity identifier was extracted;
    selecting, from among the plurality of entity identifiers, the entity identifier that was extracted from the highest number of the one or more search results; and
    indicating that the selected entity identifier is the answer to the query.

7. The method of claim 1, wherein extracting one or more entity identifiers from the one or more search results comprises, for at least one of the one or more search results:
    identifying a title of a document associated with the at least one search result;
    identifying a title format associated with the document; and
    extracting, using the title format, a portion of the title as the entity identifier associated with the at least one search result.

8. The method of claim 7, wherein identifying the title format associated with the document includes identifying an Internet domain associated with the document, the title format being associated with the Internet domain.

9. The method of claim 1, wherein:
    identifying the one or more search results that are responsive to the query comprises identifying one or more search results that are each associated with one of a plurality of different information sources;

the method further comprises identifying a proper subset of the one or more search results, the proper subset comprising only one or more search results that are associated with a particular information source; and extracting the one or more entity identifiers from the search results comprises extracting the one or more entity identifiers from only the proper subset of the one or more search results.

10. The method of claim 9, wherein identifying the proper subset of the one or more search results comprises identifying one or more search results that reference a resource hosted in a particular Internet domain.

11. A system comprising:
one or more computers and one or more storage devices storing instructions that are operable, when executed by the one or more computers, to cause the one or more computers to perform operations comprising:
receiving a query that includes one or more query terms;
extracting one or more entity identifiers from one or more search results that are responsive to the query;
determining whether all of the extracted entity identifiers match or do not match at least one of the one or more query terms; and
classifying the query as a description-triggering query or as an entity-triggering query, the query being classified as a description-triggering query based on determining that all of the extracted entity identifiers match the at least one of the one or more query terms, or the query being classified as an entity-triggering query based on determining that all of the extracted entity identifiers do not match the at least one of the one or more query terms;
wherein a description triggering query is a query for which a natural language snippet associated with one or more of the search results is provided as an answer to the query, and wherein an entity-triggering query is a query for which an entity identifier that does not match one or more of the query terms is provided as an answer to the query.

12. The system of claim 11, wherein the operations comprise:
based on classifying the query as the entity-triggering query, selecting a response format designated for queries classified as entity-triggering queries, wherein the selected response format is not designated for queries classified as description-triggering queries; and
providing a response to the query using the selected response format.

13. The system of claim 11, wherein the operations comprise:
based on classifying the query as the description-triggering query, selecting a response format designated for queries classified as description-triggering queries, wherein the selected response format is not designated for queries classified as entity-triggering queries; and
providing a response to the query using the selected response format.

14. The system of claim 11, wherein:
extracting one or more entity identifiers from the one or more search results comprises extracting multiple entity identifiers from the one or more search results.

15. The system of claim 14, wherein the operations comprise:
determining that a plurality of entity identifiers in the extracted multiple entity identifiers do not include any of the one or more query terms;
selecting, from among the plurality of entity identifiers, an entity identifier that was extracted from a highest-scoring search result of the identified one or more search results; and
indicating that the selected entity identifier is the answer to the query.

16. The system of claim 14, wherein the operations comprise:
determining that a plurality of entity identifiers in the extracted multiple entity identifiers do not include any of the one or more query terms;
counting, for each entity identifier in the plurality of entity identifiers, a number of the one or more search results from which the entity identifier was extracted;
selecting, from among the plurality of entity identifiers, the entity identifier that was extracted from the highest number of the one or more search results; and
indicating that the selected entity identifier is the answer to the query.

17. The system of claim 11, wherein extracting one or more entity identifiers from the one or more search results comprises, for at least one of the one or more search results:
identifying a title of a document associated with the at least one search result;
identifying a title format associated with the document; and
extracting, using the title format, a portion of the title as the entity identifier associated with the at least one search result.

18. The system of claim 17, wherein identifying the title format associated with the document includes identifying an Internet domain associated with the document, the title format being associated with the Internet domain.

19. A non-transitory computer storage medium encoded with a computer program, the program comprising instructions that when executed by one or more computers cause the one or more computers to perform operations comprising:
receiving a query that includes one or more query terms;
extracting one or more entity identifiers from one or more search results that are responsive to the query;
determining whether all of the extracted entity identifiers match or do not match at least one of the one or more query terms; and
classifying the query as a description-triggering query or as an entity-triggering query, the query being classified as a description-triggering query based on determining that all of the extracted entity identifiers match the at least one of the one or more query terms, or the query being classified as an entity-triggering query based on determining that all of the extracted entity identifiers do not match the at least one of the one or more query terms;
wherein a description triggering query is a query for which a natural language snippet associated with one or more of the search results is provided as an answer to the query, and wherein an entity-triggering query is a query for which an entity identifier that does not match one or more of the query terms is provided as an answer to the query.

* * * * *